United States Patent [19]

Amstutz et al.

[11] Patent Number: 4,605,822
[45] Date of Patent: Aug. 12, 1986

[54] ACTIVE EQUALIZATION CIRCUIT

[75] Inventors: Johann Amstutz, Döttingen; Bruno Wenger, Au, both of Switzerland

[73] Assignee: Siemens Aktiengesellschaft, Berlin and Munich, Fed. Rep. of Germany

[21] Appl. No.: 644,088

[22] Filed: Aug. 24, 1984

[30] Foreign Application Priority Data

Sep. 30, 1983 [CH] Switzerland .................. 5325/83

[51] Int. Cl.[4] .............................................. H04B 3/08
[52] U.S. Cl. .......................... 179/16 AA; 179/170.2; 333/28 R
[58] Field of Search ........ 381/103; 179/16 F, 16 AA, 179/16 A, 170.2; 330/282, 86, 126, 304; 333/18, 28 R

[56] References Cited

U.S. PATENT DOCUMENTS

| 3,446,996 | 5/1969 | Toffler .............................. 333/28 R |
| 3,732,410 | 5/1973 | Mackechnie ...................... 179/170.2 |
| 4,011,530 | 3/1977 | Carver .............................. 333/28 R |
| 4,087,654 | 5/1978 | Mueller ............................ 179/170.2 |
| 4,219,788 | 8/1980 | Cordell ............................ 333/28 R |
| 4,242,650 | 12/1980 | Cordell ........................... 333/28 R |
| 4,258,340 | 3/1981 | Ryu ................................. 333/18 |
| 4,273,963 | 6/1981 | Seidel .............................. 179/16 F |
| 4,490,692 | 12/1984 | Schorr ............................ 333/28 R |

FOREIGN PATENT DOCUMENTS 8301876  5/1983  World Int. Prop. O. ....... 179/170.2

OTHER PUBLICATIONS

"Transconductance Amplifiers with Linearizing Diodes and Buffers", National Semiconductor Linear Hand Book, 1982, pp. 10-258, 10-259, 10-265, 10-266.
Elekronik—"Stromgesteuerte Hochpassfilter"—Nov. 3, 1983, pp. 89-90.
IEEE Transactions on Circuits and Systems, vol. CAS-29, No. 5, May 1982, "A New Family of Active Variable Equalizers" by Robert R. Cordell.

Primary Examiner—Gene Z. Rubinson
Assistant Examiner—R. Vaas
Attorney, Agent, or Firm—Thomas H. Jackson

[57] ABSTRACT

The active equalization circuit utilizes an electronic potentiometer inserted between the output of an addition amplifier and the input of the equalization structure, wherein the controlled output signal of the potentiometer is supplied to the addition input of the addition amplifier via the series circuit of an impedance transformer and of an impedance. A control network with at least one current controlled circuit functions as the electronic potentiometer. This current controlled circuit being inserted between the input of the impedance transformer and the output of the addition amplifier, and/or between the input of the impedance transformer and the input connection of the equalization structure. The active equalization circuit can be advantageously inserted in a hybrid arrangement between the output of a hybrid circuit connected to a two-wire line and the input of an echo compensator, where the echo compensator is controlled via a control circuit by the output signal of the echo compensator.

5 Claims, 6 Drawing Figures

ACTIVE EQUALIZATION CIRCUIT

BACKGROUND OF THE INVENTION

This invention relates to an active equalizing circuit having an electronic potentiometer comprising a control network with at least one current controlled circuit.

A large variety of equalization structures are used in transmission processes. For example, "IEEE Transactions on Circuits and Systems", Vol. CAS-29, No. 5, May 1982, page 316–322, FIG. 8, discloses an equalizing structure with a potentiometer according to R. R. Cordell, that is inserted between the output of an operation amplifier and the input clamp of the equalizer structure by connecting the center tap of the potentiometer with the inverting input of the operational amplifier via the series circuit of an emitter follower and a resistor. On one side this inverting input is connected to the input clamp of the equalizing structure, via a series resistance, and, on the other side, it is connected to the output of the operation amplifier via a feedback resistance. Such an equalizer structure with an electronic potentiometer can be used advantageously as an active equalizing circuit. One disadvantage of such an equalizing structure however, is that none of the three electronic potentiometer connections are connected to ground. Furthermore, such ground connections can only be made at a relatively high cost.

SUMMARY OF THE INVENTION

It is an object of the present invention to provide an active equalizing circuit that is easily realized and cascaded.

In general, the invention features, an active equalization circuit with an equalization structure that includes an electronic potentiometer inserted betweeen an output of an addition amplifier and an input of the equalization structure, the controlled output signal of said potentiometer being supplied via a series circuit of an impedance transformer and of an impedance to an addition input of the addition amplifier, wherein there is provided as the electronic potentiometer a control network with at least one current controlled circuit that is inserted between the input of the impedance transformer and the output of the addition amplifier, and/or between the input of the impedance transformer and the input of the equalization structure.

In preferred embodiments of the equalization circuit the current controlled circuit is controlled by the inverted control signal of the active equalization circuit; the equalization structure is provided on its output side with at least one additional equalization structure connected in series; an amplifier having bandpass filter characteristics is inserted between the two equalization structures; at least one low pass filter is arranged on the output side of the equalization structure; the equalization circuit is used as a variable equalizer in a hybrid arrangement, wherein the variable equalizer is inserted between the output of a hybrid circuit, connected to a two-wire line, and the input of an echo compensator, and wherein the variable equalizer is controlled by the output signal of the echo compensator via a control circuit; the active equalization circuit used as a variable equalizer also includes a filter network, arranged on the input side of the hybrid circuit, that transforms rectangular input pulses into output pulses with a cosine-like frequency spectrum.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
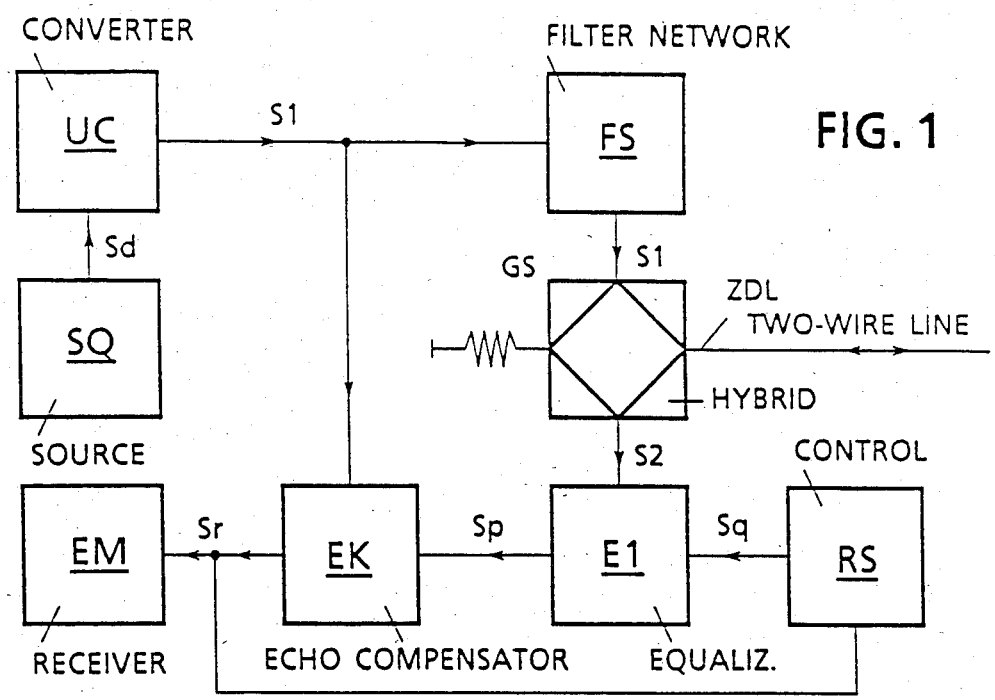
FIG. 1 shows diagrammatically a hybrid arrangement with an active equalizing circuit according to the invention.

The hybrid arrangement illustrated in FIG. 1 is equipped with data transmission source SQ of which output signal Sd may be supplied via code converter UC to the control input of echo compensator EK and to the transmitting input of hybrid circuit GS which is connected to a two-wire line ZDL. The receiving output signal S2 of hybrid circuit GS is supplied to the input of active equalizing circuit E1 of which output signal Sp is supplied to an additional input of echo compensator EK. Output signal Sr of echo compensator EK is supplied both to the input of data receiver EM and also to the input of control circuit RS, of which output signal Sq controls active equalizing circuit E1. A hybrid arrangement of this type is an example of an application for an active equalizing circuit according to the invention. The control circuit RS can be formed, for example, by the items 108, 109 and 110 in FIG. 1 of the U.S. Pat. No. 4,273,963 (Seidel).

Figure 2:
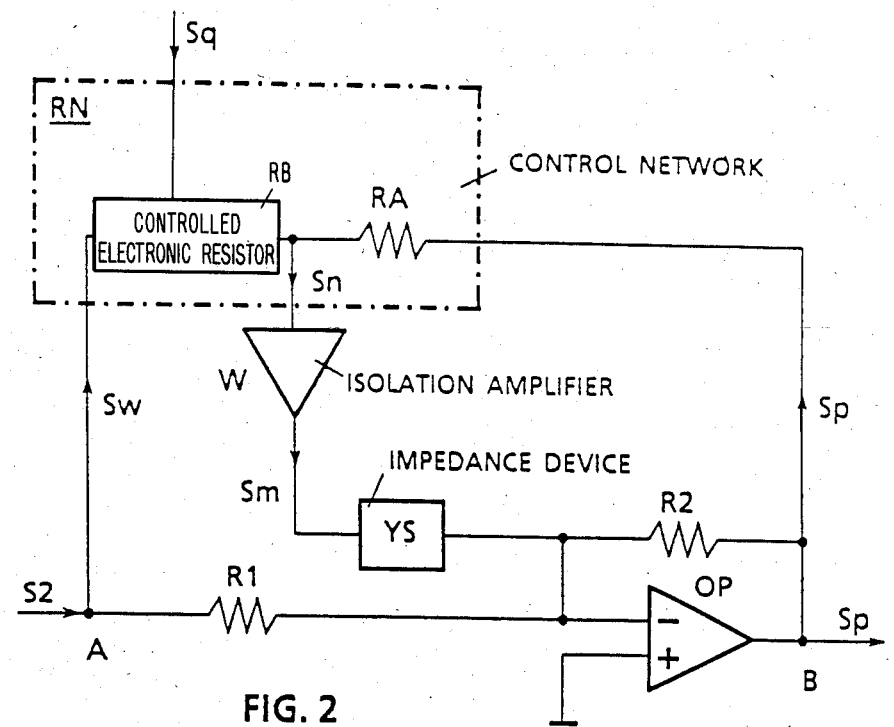
FIG. 2 shows diagrammatically an active equalizing circuit according to the invention which can be used in the hybrid arrangement of FIG. 1.
Figure 4:
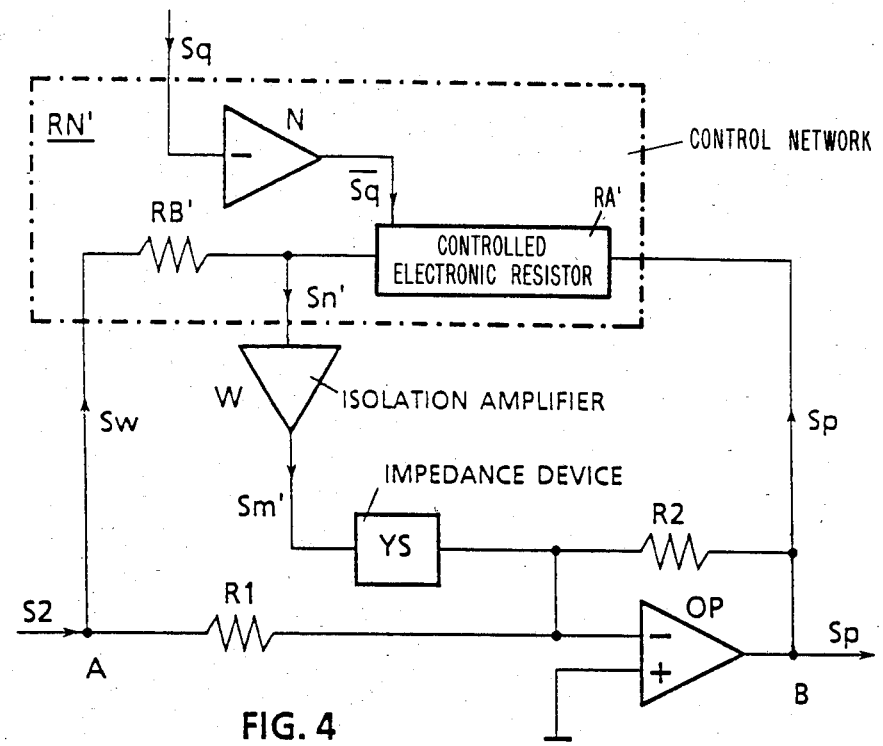
FIG. 4 shows diagrammatically another active equalizing circuit according to the invention which can also be used in the hybrid arrangement of FIG. 1.

The equalization structure as shown in FIG. 2 or FIG. 4 corresponds to that disclosed by R. R. Cordell in U.S. Pat. No. 4,242,650 insofar as here control network RN is provided as a replacement for the potentiometer. In this structure input signal S2 at input clamp A corresponds to the input signal S2 of active equalizing circuit E1 in FIG. 1. Output signal Sp of operation amplifier OP corresponds to its output signal, and control signal Sq of control network RN corresponds to the control signal of equalizing circuit E1 of FIG. 1. Output signal Sn (FIG. 2) or Sn' (FIG. 4) of control network RN is supplied to the inverting input of operation amplifier OP via the series circuit of isolation amplifier W and of the impedance device YS. The operating method of an equalizing circuit of this type with a control network of a different type has been disclosed by R. R. Cordell in U.S. Pat. No. 4,242,650.

Control network RN' of FIG. 2 and control network RN of FIG. 4 have an input for each of the signals Sp, Sq and Sw, and an output for signals Sn and Sn'. Signal Sp is supplied to the input of the isolation amplifier W via a first attenuator RA while signal Sw is supplied to said input via second attenuator RB. In FIG. 4, signal Sq is conducted via an inverting amplifier N to control attenuator RA'.

Figure 3:
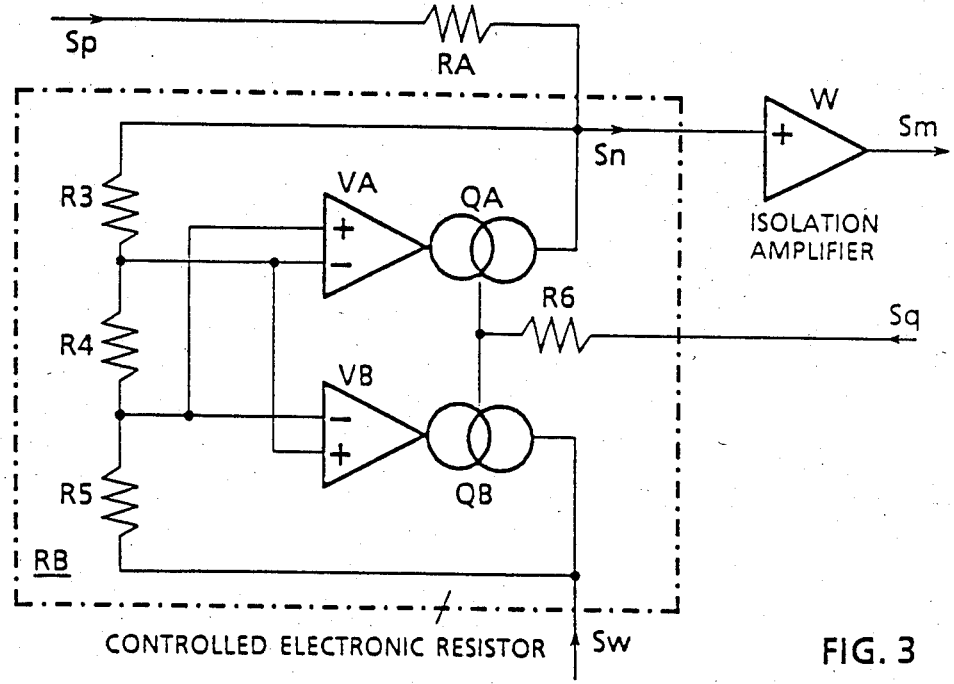
FIG. 3 shows diagrammatically an active control network for the equalizing circuit of FIG. 2.
Figure 5:
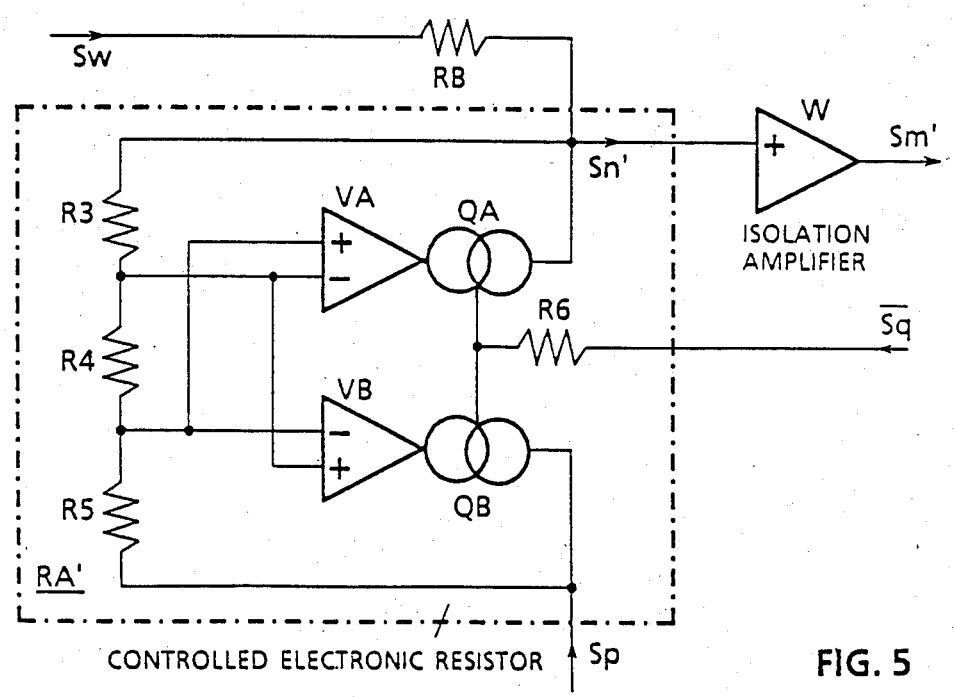
FIG. 5 shows diagrammatically an active control network for the equalizing circuit of FIG. 4.

Attenuators RB (FIG. 2) and RA' (FIG. 4) are formed by a so-called controlled electronic resistor, as shown in FIGS. 3 and 5. The operating method of a controlled electronic resistor of this type is known, for example, from the data sheet of the "Dual Operational Transconductance Amplifier" of the LM 13700 series (FIG. 10, page 10-266, National Semiconductor Audio/Radio Circuits Handbook).

In each of FIG. 3 and FIG. 5 is shown one such controlled electronic resistor. The two operation amplifiers VA and VB are each connected at their outputs with a controlled current source QA and QB respectively. Furthermore, the output of the controlled current source QA in each figure is connected to the input of isolation amplifier W. In FIG. 3, the output of controlled current source QB is connected to terminal A (FIG. 2) which provides signal Sw. Between the two inverting inputs of operation amplifiers VA and VB is connected resistor R4. Also, the noninverting input of operation amplifier VA is connected to the inverting input of operation amplifier VB. The inverting input of operation amplifier VB is connected via resistor R5 to the output of controlled current source QB, while the inverting input of operation amplifier VA is connected with the non-inverting input of operation amplifier VB and also connected through resistor R3 to the output of controlled current source QA. The controlling input of each of these controlled current sources QA and QB are connected via a resistor R6 to their respective controlling inputs Sq (FIG. 2) and s̄q (FIG. 4).

As a result of the invention it was discovered that in an equalizing structure as shown in FIG. 2 or 4, the realization of the elements RA' or RB as controlled electronic resistors results in an active equalizer that can be realized at a relatively low cost. Impedance device YS can be formed by simply arranging several resistor/capacitor—members (RC members) in parallel. An equalizer of this type can simply be inserted between the output of echo compensator EK and the input of receiver EM in a conventional hybrid circuit in which E1 is a fixed equalizer.

Figure 6:
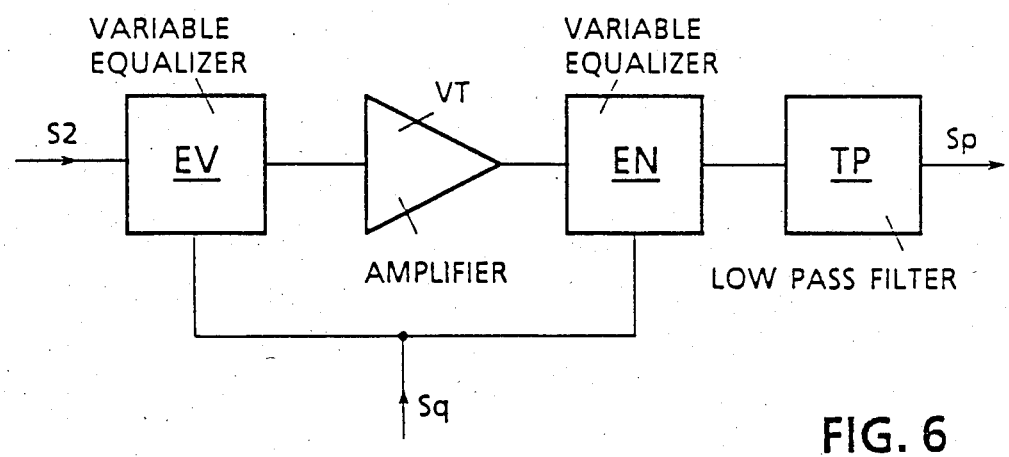
FIG. 6 shows diagrammatically two equalizing structures connected in series.

Moreover, the equalizer of the invention, as shown in FIGS. 2 and 3 or in FIGS. 4 and 5, can also be inserted as variable equalizer E1 between the output of hybrid circuits GS and the input of echo compensator EK as shown in FIG. 1, without causing instabilities. In addition, the equalizer E1 in FIG. 1 may also be an active equalizer circuit as shown in FIG. 6, which includes a series circuit of a first variable equalizer EV, an amplifier VT having a transfer function like a band pass filter, a second variable equalizer EN and, for example, an active low pass filter TP, in which both equalizers EV and EN may be controlled together without causing instabilities. Equalizers EV and EN may be of identical or similar construction. A single equalizer, as shown in FIGS. 2, 3 or 4, 5, or an equalizer circuit as shown in FIG. 6 with at least two equalizers EV, EN as shown in FIGS. 2, 3 or 4, 5, can also be used if there is arranged upstream of the input of corresponding hybrid circuit GS of the corresponding remote counter station, a filter network FS that transforms rectangular input pulses to output pulses with a cosine-shaped frequency spectrum. This results in the creation of a transmission system with two hybrid arrangements that provides an advantageous combination between the desired pass band and the attenuation in the frequency range above one of a predetermined limit frequency. In conclusion, it should be mentioned that the inverting input of operation amplifier OP serves as a summation point, and therefore operation amplifier OP can be replaced by an addition-and-amplifying circuit or by an adder-amplifier.

There has thus been shown and described a novel active equalization circuit which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. An active equalizer circuit with an equalization structure containing an addition amplifier inserted between an input terminal and an output terminal of the equalization structure as well as an impedance device inserted between an input of the addition amplifier and an output of an isolation amplifier whose input is connected both to the output terminal and the input terminal of the equalization structure, respectively, via attenuation means characterized in that the attenuator means comprises a resistor (RA or RB') of a fixed resistance and a controlled electronic resistor (RB or RA') of variable resistance, a controlling input of the controlled electronic resistor forming a controlling input of the active equalizer circuit; that the controlled electronic resistor contains first and second operational amplifiers (VA; VB) each driving a respective controlled current source (QA; QB), an output of one of the current sources (QA) being connected to the input of the isolation amplifier (W) and an output of the other current source (QB) being connected to either the input or output terminal of the equalization structure; and that this controlled electronic resistor contains a resistor (R4) inserted between two respective signal inverting inputs of the two operational amplifier (VA or VB), a non-inverting input of the first operational amplifier (VA) being connected to the inverting input of the second operational amplifier and, via a second resistor (R5), to the output of the one current source (QB) driven by the second operational amplifier, while the inverting input of the first operational amplifier (VA) is connected to a non-inverting input of the second operational amplifier (VB) and, via a third resistor (R3), to the output of the other current source (QA) and each one of these current sources (QA, QB), having a control input connected to the control input of the controlled electronic resistor.

2. The active equalizer circuit according to claim 1, further characterized in that it consists of at least two series-connected equalizer structures (EV, EN) of the same type.

3. The active equalizer circuit according to claim 2, further characterized in that an amplifier (VT) having a band pass transfer function is inserted in series between at least two series-connected equalizer structures (EV and EN).

4. The active equalizer circuit according to claim 1 further characterized in that the equalizer structure is succeeded in series connected fashion by at least one low pass filter (TP).

5. An active equalizer circuit according to claim 1 of a hybrid arrangement, the hybrid arrangement comprising a hybrid circuit (GS) for receiving a transmitted signal and for transmitting a received signal and thus for providing a bidirectional line terminal (ZDL), the hybrid arrangement further comprising a data transmission source (SQ) whose output is connected to a transmitting signal input of the hybrid circuit (GS) and to a first input of an echo compensator (EK) which furnishes an output signal (Sr) fed to the input of a data receiver (EM) on the one hand and, via a control circuit (RS), to the control input of the active equalizer circuit (E1) on the other hand, the input terminal of the active equalizer circuit being connected to an output for the received signal input to the hybrid circuit (GS) and the output terminal of the active equalizer circuit being connected to a second input of the echo compensator (EK).

* * * * *